May 8, 1962   E. GRANKOWSKI   3,033,143
HYDRAULIC PRESS
Filed Sept. 27, 1955   3 Sheets-Sheet 1
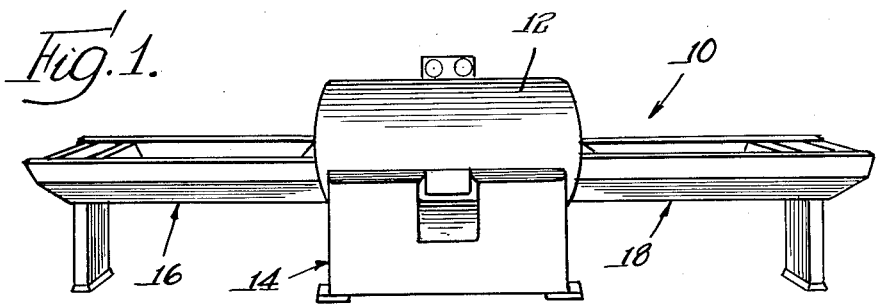
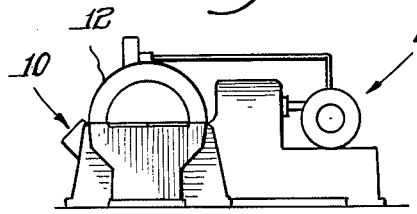
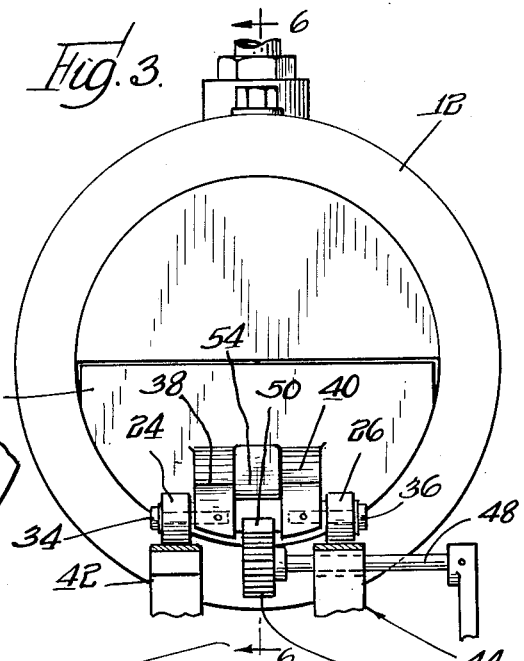
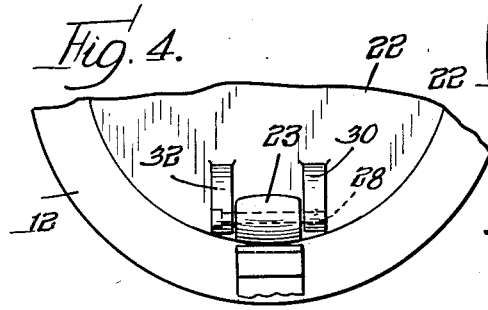
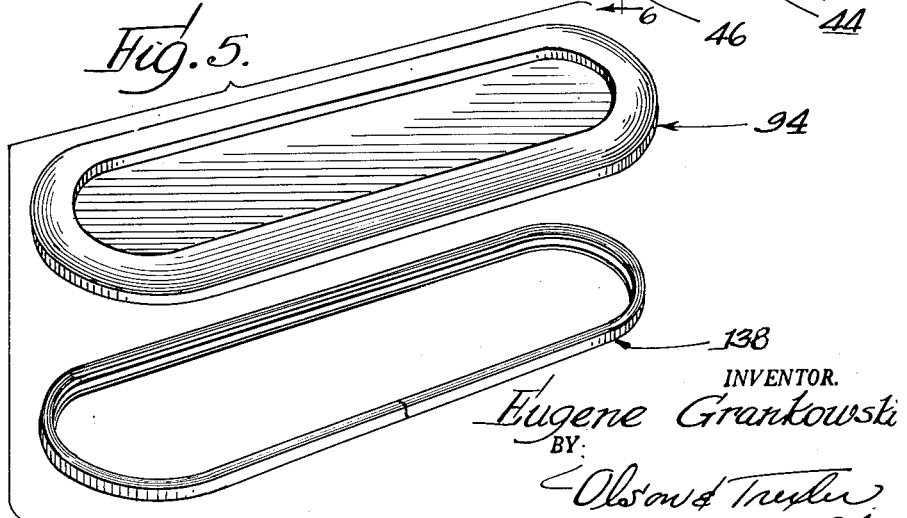
INVENTOR.
Eugene Grankowski
BY
Olson & Trexler
Attys May 8, 1962  E. GRANKOWSKI  3,033,143
HYDRAULIC PRESS
Filed Sept. 27, 1955  3 Sheets-Sheet 2
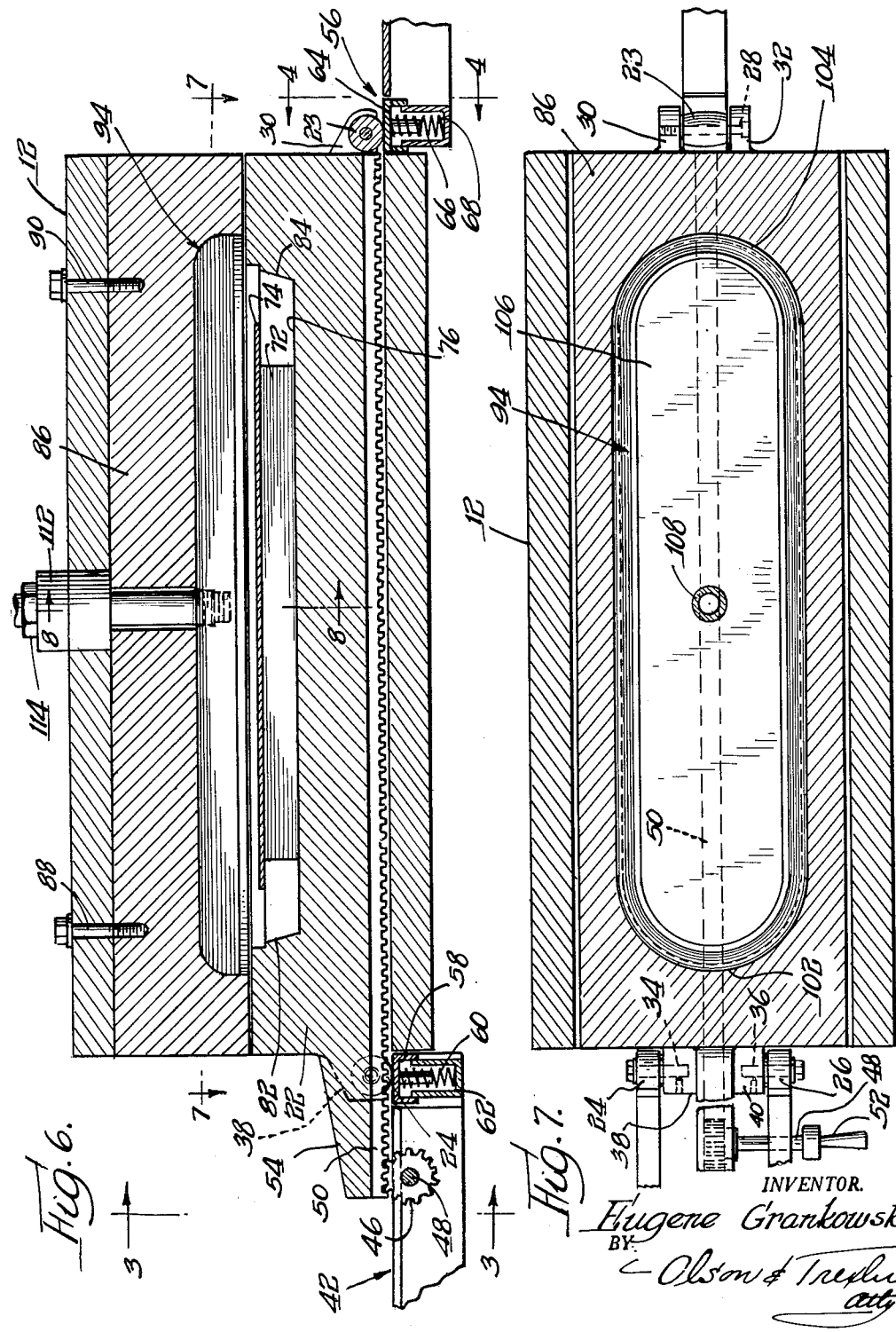
INVENTOR.
Eugene Grankowski
BY Olson & Trexler
attys May 8, 1962 E. GRANKOWSKI 3,033,143
HYDRAULIC PRESS Filed Sept. 27, 1955 3 Sheets-Sheet 3

INVENTOR.
Eugene Grankowski
By: Olson & Trexler
attys 3,033,143
HYDRAULIC PRESS
Eugene Grankowski, Chicago, Ill., assignor to Verson Allsteel Press Company, Chicago, Ill., a corporation of Delaware
Filed Sept. 27, 1955, Ser. No. 537,026
7 Claims. (Cl. 113—44)

The present invention relates to a novel hydraulic press, and more particularly to a novel press of the type wherein a deformable resilient block of rubber or the like is expanded by hydraulic fluid under pressure and is pressed against a workpiece for forming the workpiece.

Heretofore proposed hydraulic presses of the general type contemplated herein have been fabricated so that there is a number of parts engageable with the deformable pressure block or pad, which parts serve to confine the pressure block when it is expanded into engagement with a workpiece. As a result of such multiple part construction, there is a plurality of cracks or crevices between the parts into which the deformable rubber or rubber-like block may be extruded when it is expanded by hydraulic fluid under high pressure. When the hydraulic pressure is released, any portion of the rubber block which has been forced into a crack or crevice will be torn or chewed away from the block so that in a short time the deformable rubber block must be replaced at considerable expense. Heretofore it has been the practice to attempt to eliminate or reduce cracks or crevices into which the rubber block might be extruded by accurately forming and fitting the various parts. This results in an expensive press construction which is relatively difficult to fabricate, and even when the parts are properly fitted, the problem of excessive wear of the deformable rubber block may not be eliminated.

An important object of the present invention is to provide a novel hydraulic press of the above described type which is constructed so that any possibility of the deformable rubber or rubber-like pad becoming excessively worn or chewed is substantially eliminated.

Another object of the present invention is to provide a novel hydraulic press wherein excessive wear of the deformable block is substantially eliminated while at the same time a structure is provided which may be more economically produced than generally similar structures heretofore proposed and which may be easily assembled or serviced since it is substantially foolproof with respect to the problem of eliminating excessive wear of the deformable rubber block.

In a hydraulic press of the type contemplated herein there is usually provided tray means for carrying a workpiece to be formed and roof means for backing up the deformable rubber or rubber-like block, and a clearance is provided between the tray means and the roof means so that the tray means may be shifted to and from loading and work stations. As a result, there is a crack or crevice between the tray means and the roof means, and it is another important object of the present invention to provide the hydraulic press with novel and simple and economical means for preventing the deformable rubber or rubber-like block from being forced into the crevice between the tray means and the roof means or into any generally similar crevice.

Other objects and advantages of the present invention will become apparent from the following description and the accompanying drawings wherein:

FIG. 1 is a perspective view showing a hydraulic press embodying the principles of this invention;

FIG. 2 is a partially diagrammatic end elevational view of a hydraulic press embodying the principles of this invention;

FIG. 3 is a fragmentary sectional view taken along line 3—3 in FIG. 6;

FIG. 4 is a fragmentary sectional view taken along line 4—4 in FIG. 6;

FIG. 5 is an exploded perspective view showing a novel deformable pressure block or pad assembly formed in accordance with the present invention;

FIG. 6 is a fragmentary sectional view taken along line 6—6 in FIG. 3;

FIG. 7 is a fragmentary sectional view taken along line 7—7 in FIG. 6;

Figure 8:
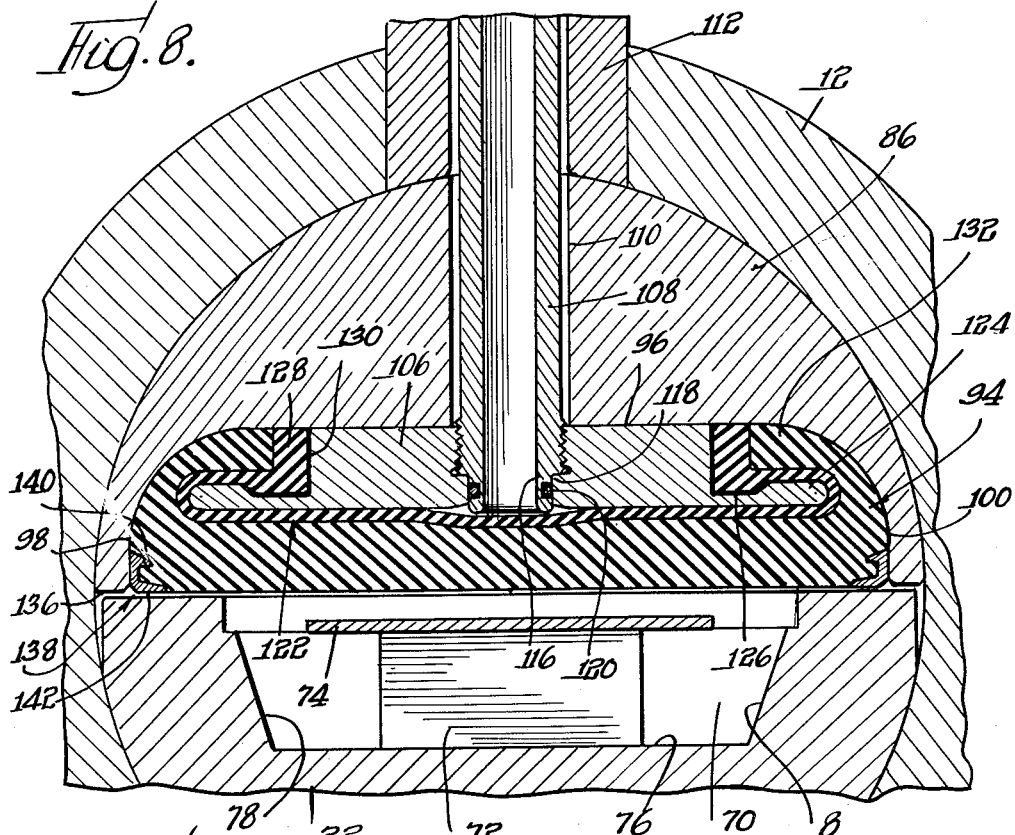
FIG. 8 is an enlarged fragmentary sectional view taken along line 8—8 in FIG. 6.

Referring now more specifically to the drawings wherein like parts are designated by the same numerals throughout the various figures, a hydraulic press incorporating the features of the present invention is generally shown in FIGS. 1 and 2 and is designated by the numeral 10. The press 10 includes a heavy cylindrical main frame 12 suitably mounted on a base structure 14, which frame carries pressure applying means and is adapted to receive a workpiece carrying tray as is described in detail below. A table structure 16 is provided at one end of the frame 12 for receiving the tray during loading and unloading of the work. If desired, a second table structure 18 may be provided at the opposite end of the frame 12 for receiving a second tray so that workpieces may be loaded and unloaded from one tray on one of the table structures while the other tray is disposed within the frame means and workpieces thereon are being formed. As will be understood, the press is provided with means including a hydraulic reservoir, motor-driven pump and appropriate conduits for delivering hydraulic fluid under pressure, which means is generally designated by the numeral 20.

As shown in the drawings, the hydraulic press is provided with a workpiece supporting tray or drawer 22 which, in accordance with the present invention, is preferably in the form of a one-piece substantially semi-cylindrical casting. In order to support the tray 22 for movement to and from the work loading and unloading station on the table structure 16 and the work-forming station within the cylindrical frame 12, a roller 23 is connected with the forward end of the tray and rollers 24 and 26 are connected with the trailing end of the tray. The roller 23 is mounted by means of a shaft 28 to a pair of rigid ears 30 and 32 which are integrally or otherwise connected to the tray. The roller 23 will ride along the bottom of the frame 12 as the tray is inserted within and withdrawn from the cylindrical frame and, therefore, the peripheral surface of this roller is preferably curved so as to conform with the interior surface of the cylindrical frame. The rollers 24 and 26 are respectively carried by shafts or axles 34 and 36 respectively extending into ears 38 and 40 which are also integrally or otherwise rigidly connected with the tray. The table structure 16 includes elongated track means 42 and 44 beneath the rollers 24 and 26 respectively. In order to actuate the tray member to and from the work loading and work forming positions, a pinion 46 is fixed on a rotatable shaft 48 for engaging an elongated rack 50 secured within a slot formed in the bottom of the tray. The shaft 48 may be rotated manually by means of a crank 52 or the like, or, if desired, suitable power means, not shown, may be provided for driving the shaft. As shown best in FIGS. 6 and 7 a portion of the rack 50 projects rearwardly from the trailing end of the tray 22 and is supported by a rearwardly extending arm 54 integral with or otherwise rigidly connected to the tray so that the pinion 46 may be positioned rearwardly of the frame 12 while still permitting the tray to be fully inserted within the frame.

It will be appreciated that the rollers support the tray 22 so that sufficient clearance is provided between the bottom of the tray and the frame member 12 to permit the tray to be shifted into and out of the frame member. However, it is desirable to have the tray rest directly against the bottom of the frame member 12 during a workpiece forming operation so that the rollers do not have to be capable of withstanding the full downward pressure applied to the tray during a workpiece forming operation. This result is obtained in accordance with the present invention by providing the track means 42 and 44 with yieldable portions located beneath the rollers 24 and 26 when the tray is at the work station and also by providing a centrally located yieldable track means 56 at the forward end of the frame member 12 and beneath the roller 23 when the tray is at the work station. More specifically, the track means 42 is provided with a section 58 adjacent the frame member 12, which track section is yieldably biased upwardly by heavy compression spring means 60 mounted on a rigid member 62 forming a part of the table structure 16. The track means is provided with an identical yieldably supported track section which need not be described in detail, and the track means 56 for the forward roller 23 also comprises a section 64 biased upwardly by heavy compression spring means 66 supported by a rigid member 68. It is understood that the compression spring means normally will support their associated track sections in substantially the same plane as the remainder of their associated track means so that the tray may be freely moved into and out of the frame 12. However, when a downward pressure is exerted against the tray during a workpiece forming operation, the various spring means will yield until the tray engages the bottom of the frame 12.

The tray 22 is provided with an elongated cavity 70 in its upper surface for receiving one or more forms or dies 72 and one or more workpieces 74 to be shaped. Preferably, the cavity is defined by a substantially flat unbroken bottom surface 76 and oppositely flaring side walls 78 and 80. End walls 82 and 84 of the cavity are rounded as shown in FIG. 7 so as to facilitate formation thereof and to eliminate sharp corners.

The pressure applying means of the hydraulic press includes a roof casting 86 disposed within and secured to the upper side of the hollow cylindrical frame member 12 by means including screws 88 and 90. A cavity is formed in the lower surface of the roof casting for receiving a deformable pressure applying block or pad which is made from rubber or any suitable rubber-like material. The cavity is defined by a smooth substantially flat inner or bottom wall 96, side walls 98 and 100 connected with the surface 96 by arcuate sections so as to eliminate sharp corners, and circular end walls 102 and 104. In accordance with an important feature of the present invention, the roof casting 86 is formed in one piece so that there are no cracks or crevices in the portions thereof engageable with the pad or block 94 whereby to eliminate undue wear and tearing away of the block. Furthermore, it has been found that the one-piece roof casting construction may be more easily and economically produced than multi-part roof structures heretofore proposed.

The deformable pad or block 94 is retained within the cavity of the roof casting by means including an elongated liner member or plate 106 preferably formed from a rigid material such as metal. The liner is in turn threaded onto a hollow stem 108 which extends through an aperture 110 in the roof casting and a bushing 112 mounted in the frame 12. A nut member 114 is threaded onto the upper end of the stem 108 so that when it is tightened against the upper end of the bushing 112, the liner 106 is drawn tightly against the surface 96 of the roof casting cavity. The stem 108 is connected, as shown in FIG. 2, with the means 20 for providing hydraulic fluid under pressure. In order to prevent hydraulic fluid under pressure from leaking around the periphery of the stem and through the threaded aperture in the liner 106, the stem is provided with a reduced diameter smooth walled entering end portion 116 which fits snugly within a smooth walled reduced diameter aperture 118 in the liner, and an O-ring 120 or other suitable sealing member is disposed within an annular slot in the stem for engaging the wall of the aperture portion 118.

Figure 9:
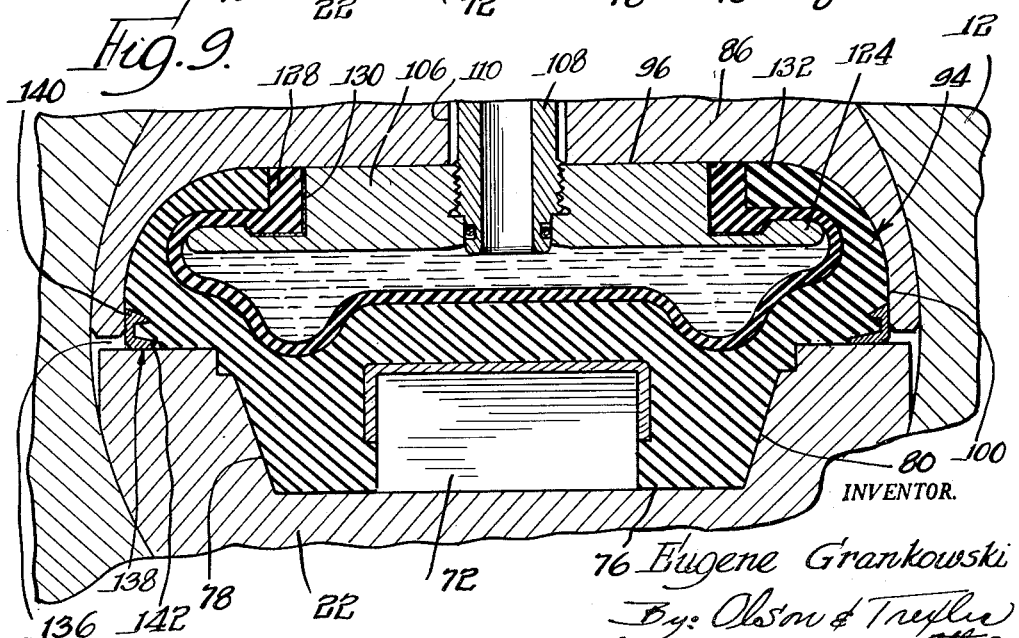
FIG. 9 is a fragmentary sectional view similar to FIG. 8 but showing the manner in which the hydraulic press operates to form a workpiece.

A flexible rubber or rubber-like diaphragm 122 is disposed between the pressure pad 94 and the liner 106 to provide a sealed fluid cell for confining hydraulic fluid introduced through the stem 108 and directing the fluid along the interior of the pressure pad. The liner 106 has a peripheral flange 124 with ends thereof rounded so as to conform to the shape of the cavity in the roof casting, and a continuous recessed seat 126 is provided entirely around the upper surface of the flange 124. The diaphragm 122 is secured to the liner 106 by extending it upwardly and around the liner flange 124 as shown in FIGS. 8 and 9. A peripheral portion 128 of the diaphragm is thickened to strengthen and rigidify it and is formed so as to extend into the recess 126 and also upwardly along the side wall of the insert to the bottom surface 96 of the roof casting cavity. The thickened diaphragm portion 128 is attached to the liner by means of a suitable adhesive 130 so as to seal the liquid cell.

The deformable pressure pad 94 is retained in assembled relationship with the liquid cell means by an integral upwardly and inwardly extending peripheral flange portion 132 which overlies the liner member flange 124 and fits snugly between the diaphragm and the surface of the roof casting cavity. It should be noted that when hydraulic fluid under pressure is introduced into the liquid cell, the flange portion 132 of the pressure pad 94 will be tightly clamped by the diaphragm against the roof casting so as to resist axial separation of the pressure pad flange 132 from the roof casting. In addition, the liner flange 124 and the diaphragm are formed so as to provide a restricted space between their outer peripheral edges and the side wall of the roof casting cavity, which space is narrower than a thickened free marginal portion of the pad flange 132 so as further to restrain the pad flange 132 from being pulled axially away from the roof casting.

As shown best in FIGS. 8 and 9, a clearance 136 is provided between the faces of the roof and tray castings so that the tray may be easily moved into and out of the frame member 12 without interfering with the roof casting. In accordance with another features of the present invention, the deformable pressure pad 94 is prevented from being forced or extruded into the space between the roof and tray casting by a sealing ring 138. The sealing ring is formed from any suitable relatively non-deformable material so that it will not be forced into the clearance 136 during a workpiece forming operation, and may, for example, be formed from extruded aluminum. As shown in FIGS. 8 and 9, the sealing ring has a generally channel-shaped cross section and flanges 140 and 142 thereof are embedded in the pad 94 so as to retain the pad and the ring in assembled relationship. As shown in FIG. 5, the sealing ring 136 is formed so that it extends continuously about the entire periphery of the pressure pad.

A brief description of the operation of the hydraulic press 10 is as follows. The desired workpiece form or die 72 is placed on the tray 22 while the tray is at the loading station on the table structure 16 and a workpiece 74 is placed on top of the form. Then the tray is shifted to the work station within the hollow cylindrical frame member 12 as shown best in FIGS. 6 and 7 and suitable control means, not shown, are operated to admit hydraulic fluid under pressure to the stem 108. As the hydraulic fluid which, for example, may be at a pressure of about 5,000 p.s.i., flows into the sealed liquid cell, the diaphragm 122 is expanded and the pressure pad 94 is also expanded and pressed against the work as shown in FIG. 9. While this forming operation is taking place, a second tray on the table structure 18 may be loaded with a workpiece, if desired. After the workpiece has been formed, the pressure on the hydraulic fluid is relieved and the pressure pad and diaphragm retract to the initial position shown in FIG. 8. Then the tray is withdrawn from the frame member 12 and the cycle is repeated as desired.

As will be understood, in certain workpiece forming operations, it may be desirable to heat the workpiece, and it is contemplated that suitable heating means, not shown, may be incorporated in the tray or the pressure applying means.

While the preferred embodiment of the present invention has been shown and described herein, it is obvious that many structural details may be changed without departing from the spirit and scope of the appended claims.

The invention is claimed as follows:

1. For use in a fluid press of the type described, a deformable work-engaging pad adapted to be expanded and pressed against a workpiece and comprising a relatively thick central body and a peripheral flange reversely bent inwardly to partially lap the adjacent portions of said body and provide therewith a recess to receive corresponding portions of a mounting liner member, the free marginal portion of said flange being of a thickness greater than that of the adjacent portion merging into said body to provide a wedging portion cooperative between the liner member and enclosing structure for restricting axial displacement of the flange from its assembled position, and an expansible diaphragm lining the interior surface of said pad and having a terminal abutment flange substantially traversing the free inner edge of the marginal portion of the pad flange.

2. In a fluid press of the type described, a roof member with top and side surfaces providing a cavity, work supporting means shiftable to operative position beneath said roof member, a liner member in said cavity with the peripheral edges thereof spaced from the top surface a greater distance than from said side surfaces, a resilient deformable work-engaging pad traversing said liner member and adapted to be expanded and pressed against a workpiece and having reversely inwardly directed flange means enclosing the peripheral edges of said liner member and terminating in an enlarged free marginal portion confined and compressed between the peripheral edge of said liner member and the adjacent top and side surfaces of the said roof member for trapping the pad against axial displacement upon expansion thereof, and an expansible diaphragm lining the interior surface of said pad and provided with flange means underlying the pad flange means and terminating in an abutment flange traversing the free inner edge of the pad flange means.

3. In a fluid press as claimed in claim 2, wherein the liner member is provided with a recess spaced inwardly of the peripheral edges thereof and facing the roof member for receiving a portion of the abutment flange on said diaphragm.

4. For use in a fluid press of the type described, a deformable work-engaging pad adapted to be expanded and pressed against a workpiece and comprising a relatively thick central body and a peripheral flange reversely bent inwardly to partially lap the adjacent portions of said body and provide therewith a recess to receive corresponding portions of a mounting liner member, the free marginal portion of said flange merging into said body and adapted to be trapped between the liner member and enclosing structure for restricting axial displacement of the flange from its assembled position, and an expansible diaphragm lining the interior surface of said pad and having a terminal abutment flange substantially traversing the free inner edge of the marginal portion of the pad flange.

5. For use in a fluid press of the type described, a deformable pad as claimed in claim 4, wherein there is provided a relatively rigid sealing member around the bottom peripheral portion of said pad for preventing the material of the pad from being forced outwardly into any crevice existing along that area in the press.

6. In a fluid press of the type described, a roof member with top and side surfaces providing a cavity, work supporting means shiftable to operative position beneath said roof member, a liner member in said cavity with the peripheral edges thereof spaced from the top surface a greater distance than from said side surfaces, and a resilient deformable work-engaging pad traversing said liner member and adapted to be expanded and pressed against a workpiece and having reversely inwardly directed flange means enclosing the peripheral edges of said liner member and terminating in a free marginal portion confined and compressed between the peripheral edge of said liner member and the adjacent top and side surfaces of the said roof member for trapping the pad against axial displacement upon expansion thereof, and an expansible diaphragm lining the interior surface of said pad and provided with flange means underlying the pad flange means and terminating in an abutment flange traversing the free inner edge of the pad flange means.

7. For use in a roofed fluid press of the type described; a liner member adapted for mounting in the press as a liner for the major central portion of the roof and including a peripheral relatively thin flange portion projecting laterally therefrom so as to be spaced from the adjacent surface of the roof when the liner member is assembled therewith, an expansible diaphragm having the marginal portion thereof turned inwardly to overlie the peripheral flange of the liner member for mounting thereon and including a terminal abutment flange substantially complementing the thickness of the adjacent portion of the liner member between the flange and roof, and a deformable work-engaging pad comprising a relatively thick body portion traversing the major portion of the diaphragm and having a peripheral flange reversely bent inwardly to overlie the diaphragm flange and the included peripheral flange of the liner member for retaining the deformable pad in unitary assembled relationship with the liner member and the diaphragm and with the free marginal portion of the pad flange merging into the body portion thereof and adapted to be trapped between the liner member and enclosing structure for restricting axial displacement of the pad flange from its assembled position, said terminal abutment flange traversing the free inner edge of the pad flange.

References Cited in the file of this patent

UNITED STATES PATENTS

| | | |
|---|---|---|
| 1,547,871 | Grunberg | July 28, 1925 |
| 2,208,149 | Vernet | July 16, 1940 |
| 2,317,440 | Cannon | Apr. 27, 1943 |
| 2,336,349 | Ernst | Dec. 7, 1943 |
| 2,416,048 | Evans | Feb. 18, 1947 |
| 2,418,393 | Bridgens | Apr. 1, 1947 |
| 2,550,672 | Chyba | May 1, 1951 |
| 2,762,395 | Lamb | Sept. 11, 1956 |
| 2,762,734 | Corral | Sept. 11, 1956 |
| 2,771,850 | Wheelon | Nov. 27, 1956 |

FOREIGN PATENTS

| | | |
|---|---|---|
| 546,776 | Great Britain | July 29, 1942 |
| 1,075,570 | France | Apr. 14, 1954 |